(12) United States Patent
Carine

(10) Patent No.: US 8,882,192 B2
(45) Date of Patent: Nov. 11, 2014

(54) CHILD'S SAFETY SEAT

(71) Applicant: Britax Romer Kindersicherheit GmbH, Ulm (DE)

(72) Inventor: David Shaun Carine, Saint Mary Bourne Nr Andover (GB)

(73) Assignee: Britax Römer Kindersicherheit GmbH, Ulm (DE)

( * ) Notice: Subject to any disclaimer, the term of this patent is extended or adjusted under 35 U.S.C. 154(b) by 0 days.

(21) Appl. No.: 13/734,459

(22) Filed: Jan. 4, 2013

(65) Prior Publication Data
US 2013/0169013 A1 Jul. 4, 2013

(30) Foreign Application Priority Data
Jan. 4, 2012 (DE) .................... 20 2012 000 064 U

(51) Int. Cl.
*B60N 2/42* (2006.01)
*B60R 22/00* (2006.01)
*B60N 2/28* (2006.01)

(52) U.S. Cl.
CPC ............ *B60N 2/2884* (2013.01); *B60N 2/2809* (2013.01)
USPC ..................................... 297/216.11; 297/472

(58) Field of Classification Search
CPC ............. B60N 2/2809; B60N 2/42709; B60N 2/2884; B60R 22/16; B60R 22/28; B60R 22/12
USPC .................. 297/250.1, 254, 216.11, 470, 472
See application file for complete search history.

(56) References Cited

U.S. PATENT DOCUMENTS

| | | | |
|---|---|---|---|
| 3,922,035 A * | 11/1975 | Wener | 297/256.13 |
| 5,082,325 A | 1/1992 | Sedlack | |
| 6,450,576 B1 * | 9/2002 | Rhein et al. | 297/250.1 |
| 6,517,154 B2 * | 2/2003 | Sawamoto | 297/216.11 |
| 6,619,752 B1 * | 9/2003 | Glover | 297/470 |
| 7,648,199 B2 * | 1/2010 | Amesar et al. | 297/216.11 |
| 2004/0239164 A1 | 12/2004 | Vits et al. | |
| 2008/0303325 A1 | 12/2008 | Scholz | |

FOREIGN PATENT DOCUMENTS

WO WO 2006/128615 A2 12/2006

OTHER PUBLICATIONS

European Search Report for Application No. 12000701.8 dated May 15, 2013.

* cited by examiner

*Primary Examiner* — Sarah B McPartlin
(74) *Attorney, Agent, or Firm* — Nelson Mullins Riley & Scarborough LLP

(57) ABSTRACT

A restraining device according to the invention for a child's safety seat provided to be fixed in a vehicle by at least one top tether, wherein the at least one top tether comprises at least one first loop that is provided to be pushed over a crossbar, is characterized in that the at least one top tether comprises a second loop provided to be pushed over restraining means.

6 Claims, 3 Drawing Sheets

CHILD'S SAFETY SEAT

Figure 1:
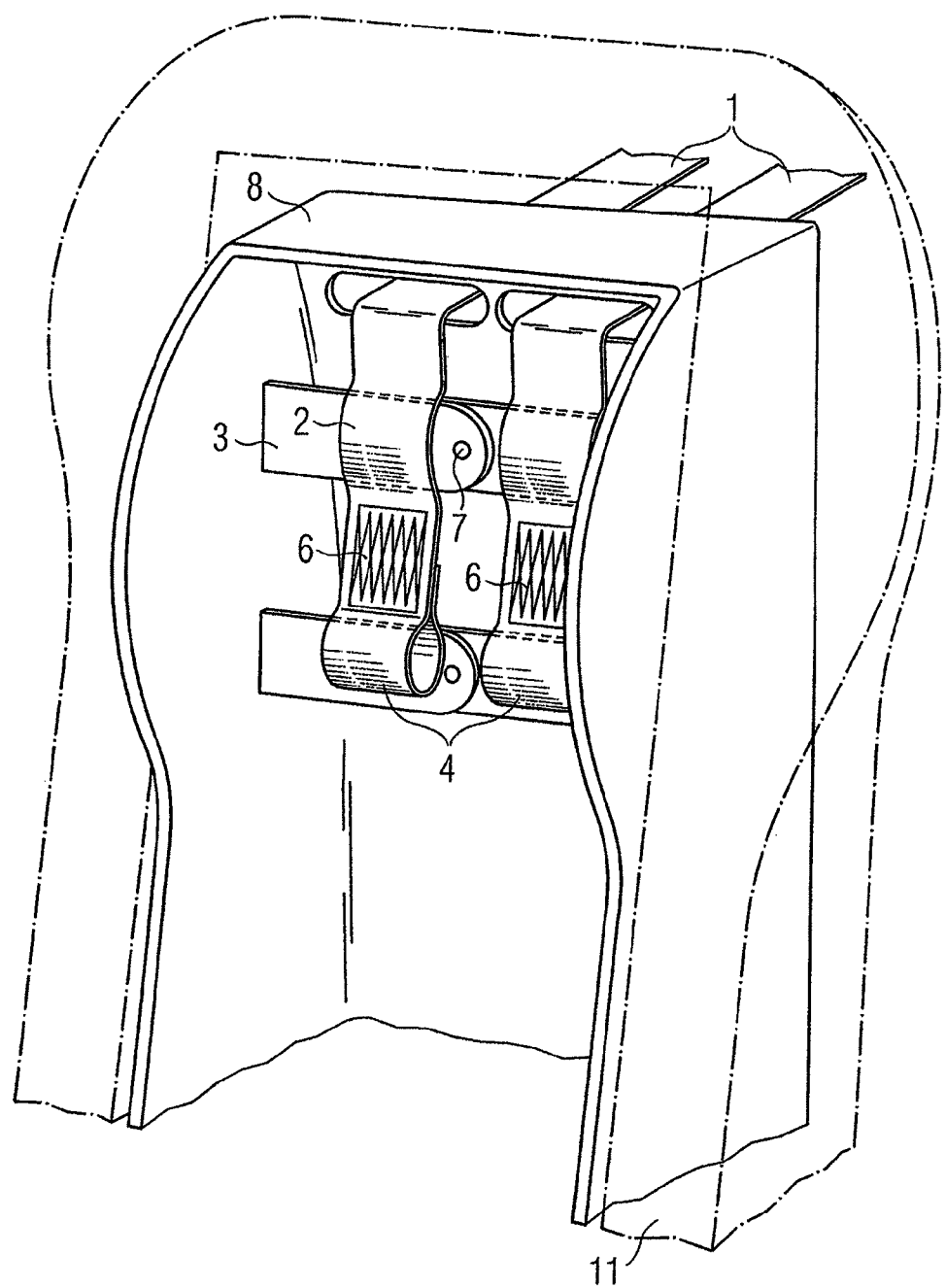

The invention relates to a restraining device for a child's safety seat provided to be fixed in a vehicle by at least one top tether, wherein the at least one top tether comprises at least one first loop provided to be pushed over a crossbar.

Such a seat is known from prior art. It is an object of the top tethers in child's safety seats to reduce or even completely prevent a forward rotation of the child's safety seat in the case of a front or rear impact. For this purpose, a child's safety seat comprises at least one top tether adapted to be firmly connected with the vehicle. To this end, modern vehicles comprise an anchor point in the vehicle in which the top tether is adapted to be mounted by means of hooks. Regularly, the top tether is guided from the child's safety seat through headrest rods and conveyed to the anchor point. After being mounted, the top tether is biased, so that a relative movement of the child's safety seat in the case of a front or a rear impact is substantially reduced or even completely prevented.

Furthermore, it is an object of the top tether to absorb energy in addition to the restraining effect. For this purpose, the conventional top tether is guided through openings into a housing arranged in the child's safety seat. For fixing the top tether, it is provided with a loop that is pushed over a crossbar. The remaining end portion of the top tether is provided with so-called rip stitches that enfold an energy absorption effect if, in the case of an impact, the child's safety seat with the occupant is forced forward due to inertia. In this process, the crossbar is loaded as a statically firm bearing that has to cope with the resistance of the rip stitches. Due to the mechanical design of the crossbar and of the rip stitches, the rip stitches are loaded by the inertial forces of the child's safety seat such that they break open by the wedge effect of the crossbar, by absorption of energy, and hence forge the crossbars ahead. After the breaking of the rip stitch area, the forward movement of the child's safety seat is terminated in that the crossbar has arrived at the loop end or the bar seam, respectively, of the top tether. Due to the forces occurring in the case of impact, the deformation forces acting upon the child's safety seat are so high that a deformation of the housing may result in problems in that carrier structures of the housing break and the safety of the child's safety seat cannot be guaranteed.

It is therefore an object of the present invention to provide a child's safety seat comprising a restraining device, avoiding the disadvantages of prior art.

The restraining device according to the invention for a child's safety seat provided to be fixed in a vehicle by at least one top tether, wherein the at least one top tether comprises at least one first loop that is provided to be pushed over a crossbar, is characterised in that the at least one top tether comprises a second loop provided to be pushed over restraining means.

Advantageously, between the two loops of the at least one top tether there is provided an energy absorption area that is, due to energy, designed to be separable and consists of so-called rip stitches in a preferred embodiment of the present invention.

These rip stitches are arranged such that, in the case of an impact, the crossbar loads the rip stitches through the inertial forces such that they break in a controlled manner and clear the way for the crossbar to move through this energy absorption area.

Advantageously, the restraining means is guided in a housing and is designed as a rod guided in two longitudinal slots, wherein the longitudinal slots are arranged in a housing such that these longitudinal slots can neither be deformed nor displaced in the case of an impact. This ensures that the longitudinal slots may always serve as a slotted guiding piece for the restraining means and ensure that torsion of the housing does not occur.

Expediently, at least one opening is arranged at the housing in the top region through which the at least one top tether is guided. This ensures that the housing of the restraining device according to the invention is designed to be torsion-resistant and that the guiding of the top tethers may be performed in a defined manner. In the restraining device for a child's safety seat according to the invention, the restraining mechanism acts in three steps, wherein the child's safety seat is forced forward due to the load occurring in the case of an impact, so that loading of the crossbar in the first loop occurs and this loop bears up to failure, then the energy absorption area prevents the further movement of the crossbar until the rip stitches break, and finally the restraining means bears up to the abutment in the longitudinal slots.

As soon as the rip stitches break in the case of an impact, a very high energy impulse exists which results in that the housing of the child's safety seat is possibly subject to torsion forces.

By means of the restraining device according to the invention it is possible that, due to the rod-shaped restraining means according to a preferred embodiment, the housing in which the at least one top tether is guided is rendered substantially torsion-resistant and a deformation of the housing and hence a deformation of the entire seat is counteracted by the defined mechanical abutment of the restraining means in the longitudinal slots.

In a preferred embodiment of the present invention, two top tethers are used. In accordance with the invention it is also possible to use two top tethers at the side of the seat, said two top tethers ending in one top tether that is finally anchored with the vehicle.

Figure 2:
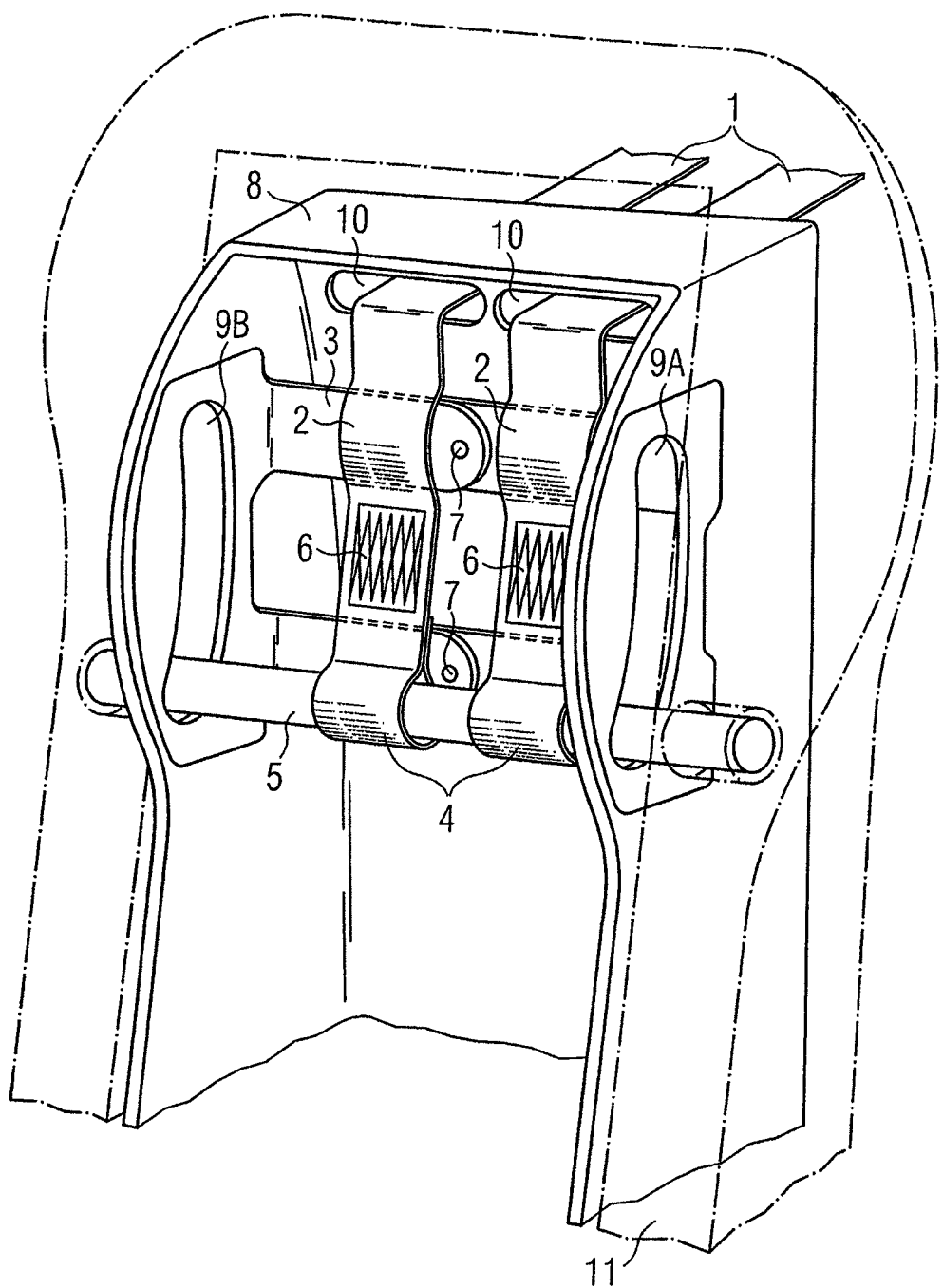
Figure 3:
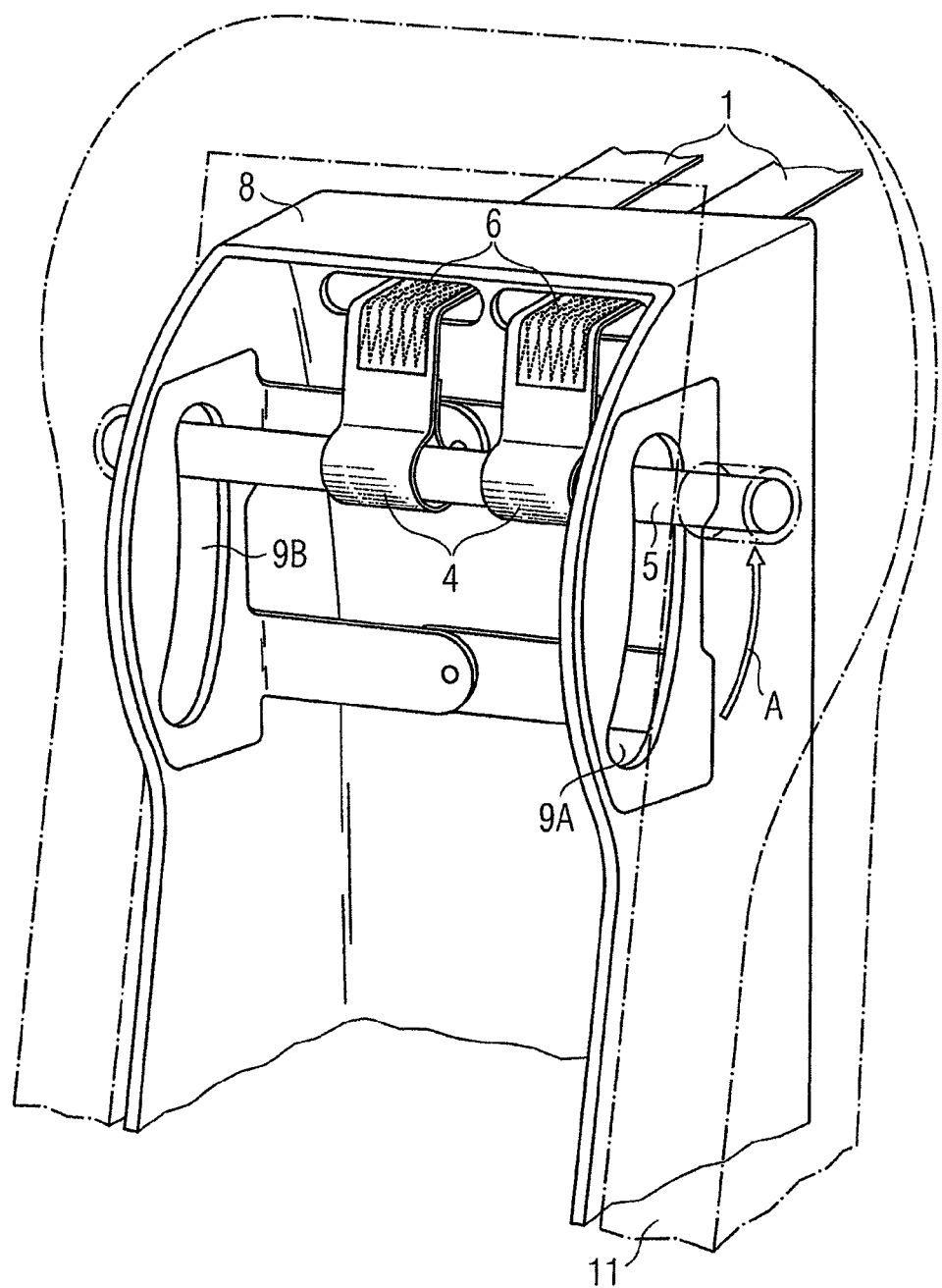

A preferred embodiment of the present invention will be described in detail by means of figures. There show:

FIG. 1 a prior art assembly;

FIG. 2 a perspective illustration of the assembly according to the invention prior to an impact;

FIG. 3 a perspective illustration of the assembly according to the invention after an impact.

FIG. 1 illustrates a restraining device of prior art, comprising two top tethers 1 that are guided in a housing 8 that is arranged in a child's safety seat 11. In the case of an impact, the entire child's safety seat is forced forward until the crossbar 3 that is connected with the top tether 1 via the loops 2 breaks open the energy absorption area 6 due to the wedge effect of the crossbar 3 and finally stops the child's safety seat in the loop end of the second loop 4.

FIG. 2 illustrates a preferred embodiment of the present invention prior to a loading case, wherein the top tethers 1 are guided in a housing 8 through openings 10 and the first loop 2 is pushed over a crossbar 3. The top tether 1 further comprises an energy absorption area 6 leading to a loop end of the second loop 4. Restraining means 5 that rests on two longitudinal slots 9A, 9B arranged in the housing 8 is pushed through the second loop 4. To facilitate assembly, the crossbar 3 may consist of two parts that are connected with each other by joining means 7.

FIG. 3 illustrates the preferred embodiment of the present invention according to FIG. 2 after a loading case has occurred. In the loading case, the seat is forced forward by inertia, so that—like in prior art—the first loop 2 absorbs a first share of force. During the further inertial motion the energy absorption area 6 of the top tethers 1 is broken up. Finally, the restraining means 5 according to the invention which rests in the second loop 4 is moved along the longitudinal slots 9A and 9B in the direction A until this motion stops at the upper end of the longitudinal slots 9A and 9B.

The present invention has the advantage that, in the loading case, the child's safety seat will come to rest after a defined movement when the top tether 1 is restrained in the longitudinal slots 9A and 9B through the restraining means 5. Due to the design of the restraining means 5 as a massive rod, a uniform force is introduced into the housing 8 via the longitudinal slots and torsion is effectively prevented, whereas in prior art the loading forces act primarily in the central region of the seat and hence introduce a bending moment that may result in torsion and finally failure of the components of the seat or the carrier structure thereof. Due to the restraining device according to the invention, the forces via the restraining means 5 and the longitudinal slots 9A and 9B are not introduced centrally, but in equal shares on the structure of the housing 8. These forces are thus absorbed by walls of the carrier structure of the housing 8 which have a much higher section modulus than the central region of the housing 8. A failure of the housing 8, for instance, by a load break, is thus substantially counteracted.

The invention claimed is:

1. A restraining device for a child's safety seat configured to be fixed in a vehicle comprising at least one top tether and a restraining means, wherein said at least one top tether comprises at least one first loop configured to be pushed over a crossbar, wherein said at least one top tether comprises a loop end forming a second loop configured to be pushed over said restraining means, wherein said restraining means is formed as a rod that is guided in two longitudinal slots, wherein the two longitudinal slots are arranged in a housing.

2. The restraining device for a child's safety seat according to claim 1, characterized in that an energy absorption area that is, due to energy, designed to be separable, is provided between said two loops of said at least one top tether.

3. The restraining device for a child's safety seat according to claim 2, characterized in that said energy absorption area consists of rip stitches.

4. The restraining device for a child's safety seat according to claim 3, characterized in that the restraining mechanism is configured to operate in three steps, wherein in a first step, in the case of loading said first loop bears force until failure, then in a second step, said energy absorption area bears force until the rip stitches break, and in a third step, said restraining means bears force up to an abutment in said longitudinal slots.

5. The restraining device for a child's safety seat according to claim 1, characterized in that said crossbar is of two-part structure.

6. The restraining device for a child's safety seat according to claim 1, characterized in that said housing is arranged in the child's safety seat and comprises openings in the upper region thereof through which said at least one top tether is configured to be guided.

* * * * *